March 13, 1962 — L. F. HALLING — 3,024,562
FISHING LURE
Filed Aug. 8, 1958
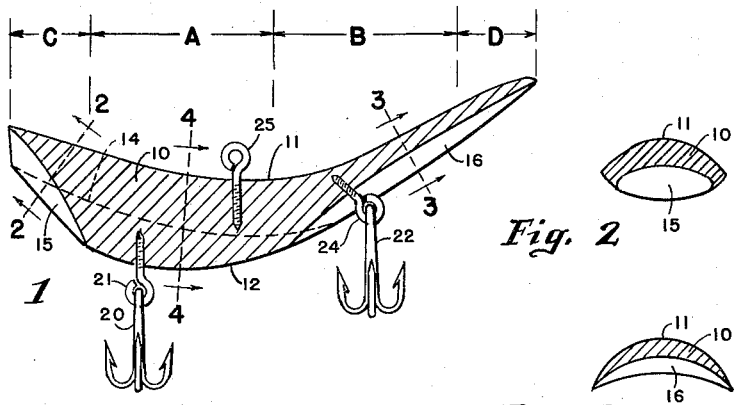
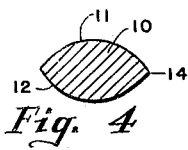
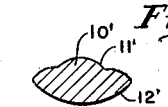
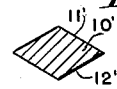
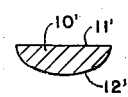
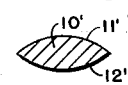
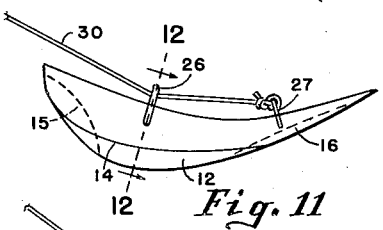
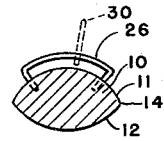
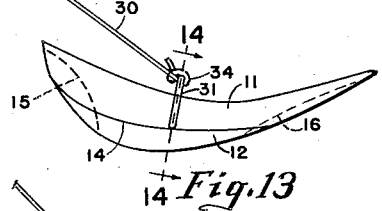
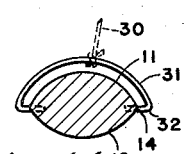
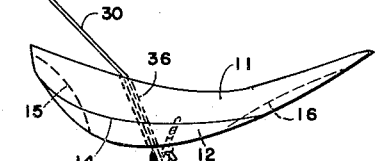
INVENTOR.
LOUIS F. HALLING
BY
Attorney

United States Patent Office 3,024,562
Patented Mar. 13, 1962

3,024,562
FISHING LURE
Louis F. Halling, 134 Bidwell Terrace, Rochester, N.Y., assignor of one-half to Robert S. Halling, Rochester, N.Y.
Filed Aug. 8, 1958, Ser. No. 754,085
2 Claims. (Cl. 43—42.48)

This invention relates to a fishing lure or artificial casting and trolling plug or spoon.

One object of the present invention is to provide a fishing lure that can be pulled through the water on a fishing line, and that will have a natural resistance to movement through the water that will cause it to undergo movements that will simulate those of a small fish.

Another object of the invention is to provide an effective fishing lure that undergoes lifelike movements when drawn through the water, and that will not foul the fishing line.

Another object of the invention is to provide a fishing lure that is especially attractive to fish because of its lifelike movements when drawn through the water, yet that is simple in construction and inexpensive to manufacture.

Other objects of the invention will be apparent hereinafter from the specification and from the recital of the appended claims.

In the drawing:

FIG. 1 is a section of a fishing lure constructed according to one embodiment of this invention, taken on the longitudinal median plane of the lure;

FIG. 2 is a section taken on the line 2—2 of FIG. 1, looking in the direction of the arrows;

FIG. 3 is a section taken on the line 3—3 of FIG. 1, looking in the direction of the arrows;

FIG. 4 is a section on a slightly reduced scale, taken on the line 4—4 of FIG. 1, looking in the direction of the arrows;

FIGS. 5 through 10 inclusive are sections, also on a reduced scale, similar to that taken on the line 4—4 of FIG. 1, but showing other shapes in which the central portion of the lure may be made;

FIG. 11 is a side elevation, on a reduced scale, of a fishing lure constructed according to another embodiment of this invention, with the hooks removed;

FIG. 12 is a section taken on the line 12—12 of FIG. 11, looking in the direction of the arrows;

FIG. 13 is a side elevation, on the same scale as FIG. 11, of a fishing lure constructed according to still another embodiment of the invention, the hooks being removed;

FIG. 14 is a section taken on the line 14—14 of FIG. 13, looking in the direction of the arrows; and FIG. 15 is a side elevation, on the scale of FIGS. 11 and 13, of a fishing lure constructed according to still another embodiment of the invention, again with the hooks removed.

Referring to the drawing now by numerals of reference, and first to the embodiment of FIGS. 1 to 4 inclusive, 10 denotes the elongate body of the fishing lure. This lure has a generally downwardly arched outline formed by its upper surface 11 and its lower surface 12. The upper surface 11 is concave; and the lower surface 12 is convex; and these surfaces have different centers of curvature. In transverse cross section the lure is of ogival shape and its top and bottom surfaces intersect somewhat sharply at opposite sides of the lure along longitudinally curved intersection lines 14 (FIGS. 1 and 4) which extend from head to tail of the lure.

The body 10 has a concavity 15 in its front end that is downwardly and rearwardly inclined from the upper surface of the body to its lower surface. The body 10 also has a concavity 16 in its underface that is crescent-shaped in cross-section (FIG. 3) and that extends from the tail of the body to approximately the mid-point of its length. The front concavity 15 is steeply inclined or sloped; and the front end portion of the lure is stubby and thick. The concavity 16 is gently sloped and the rear end portion of the lure is characterized by a less thick and more attenuated appearance than is the front end portion of the lure.

A screw eye 21 is threaded in the body 10 to project beneath the undersurface 12 of the lure, and a hook 20 is secured on the eyelet 21. A second screw eye 24, disposed to extend into concavity 16, is threaded into the body 10 through its rear end face 16, and another multiple-pronged hook 22 is secured on this screw eye. Another screw eye 25 is threaded into the body 10 to project above its upper surface 11, for attachment of the leader of the fishing line. In FIG. 1 the distances denoted at A and B are equal, and each denotes a distance equal to about 35% of the total length of the lure. The distances C and D are also equal and each is about 15% of the length of the body 10. In the embodiment of the invention shown in FIGS. 1 to 4 inclusive, the eyelet 25 is preferably positioned in zone A of the length of body 10, just forward of the transverse center line of the lure.

When a fishing line is fastened to the screw eye 25, and the lure is drawn through the water, the shape of the lure resists movement through the water in such a way that the lure follows a curved path and oscillates approximately 180° from side to side. The line tends to stop the lure from oscillating more than 180°. The leading or front end face 15 may elevate the front end of the lure slightly, and as the lure oscillates, the upper surface 11 of the lure at one side thereof may engage against the line; and the front end of the lure will then be forced down deeper in the water, and the passage of water over the front face 15 of the lure at this new inclination will tend to force the lure to oscillate to move its front end portion away from the line and to tip it upwardly again. Since the screw eye 25 is attached to the body of the lure at its concave upper side 11, and near the transverse and longitudinal center lines of the body of the lure, the placement of the screw eye 25, in relation to the design of the lure, allows a maximum of oscillatory, erratic movement, and permits the lure to follow curved erratic paths in the water. The concaved upper face 11 and the convex lower surface 12 add to the action of the lure. This type of lure is most attractive in its movement to game fish since it simulates the darting, erratic movements of minnows and small fish. The amount of swing or curving action of the lure when passing through the water, can be increased by moving screw eye 25 forward away from the transverse center line of the lure.

The lure can be made of wood, metal or plastic. It can be used as a floating or surface plug, or alternatively, as a sinking or underwater lure. Moreover, while it is preferred that one multi-pronged hook be mounted under the lower surface 12 of the lure adjacent the head head thereof, and that a second hook be mounted further toward the tail of the lure, it will be appreciated that fewer or more hooks can be attached to the lure at substantially any desired location or locations.

The lure can be of any desired shape in transverse section. For example, it can be diamond-shaped as in FIG. 5, circular as in FIG. 6, partly circular as in FIG. 7, of irregular shape as in FIG. 8, double convex as in FIG. 9, or crescent-shaped as in FIG. 10. In these figures, 10' denotes the body of the lure, 11' denotes the upper surface of the lure, and 12' denotes the lower surface of the lure. This transverse section could also be oval (not shown), or substantially any desired shape.

The fishing line can be attached to the lure in a number of different ways. For example, referring to FIG. 11, a transversely extending generally U-shaped metal bar 26 can be secured to the upper face 11 of the lure forward of the transverse center line of the lure, and a staple or screw eye 27 can be secured to the upper surface 11 of the lure rearwardly of this transverse center line. The fishing line 30 is passed between the bar 26 and the upper surface 11 of the lure, and is tied to the eyelet 27. When the line is secured to the lure in this manner, as the lure is pulled through the water, it will follow curved paths and will oscillate, but its movements will be restricted by the engagement of the line 30 against the legs of the U-shaped bar 26. Here, while the point of attachment of the line or leader is rearwardly of the transverse central plane of the lure body, the control 26 for the line is actually forward of this transverse central plane and is again in a zone corresponding to the zone A of FIG. 1.

Referring to FIG. 13, a bail 31 can also be fastened to the body 10 of the lure, with its legs 32 pressed into the two sides of the lure at the lines 14 respectively along which the upper surface 11 meets the lower surface 12. The line 30 preferably is tied to the bar 31 with a slip knot 34, that can slide from one side of the bar 31 to the other. This arrangement permits the lure to roll. The bar 31 is preferably in a zone corresponding to the zone A of FIG. 1.

In the lure shown in FIG. 15, a screw eye 35 is secured to project below the lower surface 12 of the lure, approximately at the transverse center of the lure, with its eye disposed at the lower end of a rearwardly inclined bore 36 that extends from the upper surface 11 of the lure downwardly through the lure. The line 30 is passed through the bore 36 and is tied to the screw eye 35. This type of mounting gives still other effects as the lure is drawn through the water. In this case, as in the embodiments of the invention already described, the line of draft to the body of the lure is to a location on the upper surface of the lure, intermediate the ends of the lure, and within a central area on the upper surface of the lure corresponding to the zone A of FIG. 1. In general, when the location of the line of draft to the lure body is changed, the further forward the location, the less the swing of the lure.

The embodiments of my invention, that are illustrated in FIGS. 1 through 15, represent preferred forms of lures. My invention also contemplates that the concavities 15 and 16 can be omitted. The front concavity 15 streamlines the lure, but the lure action is good when the concavity 15 is omitted. The rear concavity 16 strengthens the tail portion of the lure; the curved section shown in FIG. 3 is much stronger than a rectangular section of the same or even larger size. In addition, the tail contour, shown in FIG. 3, has little water resistance.

In the illustrated embodiments of the invention, the lure contours are curved, as is preferred for ease in manufacture and for streamlining of the lure. However, the lure may also be made up of a plurality of straight line surfaces that together form a downwardly arched outline. Moreover, the lure can be made from a plurality of segments that are glued or screwed together, or that are secured together by an articulated joint. My invention thus embraces a lure of downwardly arched outline, including upper and lower surfaces that are smoothly curved as well as upper and lower surfaces that are made up of a plurality of intersecting and adjoining straightline portions that together are arched in the desired direction.

While the invention has been described in connection with several specific embodiments thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A fishing lure comprising an elongate solid body having a longitudinally generally downwardly arched outline formed by an upper surface that is concavely curved longitudinally and a lower surface that is convexly curved longitudinally, said body having a concavity in its front end that is downwardly and rearwardly inclined from the upper surface of the body to its lower surface, the centers of curvature of the upper and lower surfaces of said body being displaced from one another, said body in transverse section being of maximum thickness at its center and decreasing in thickness toward its sides, and said body increasing in thickness from front to rear for a portion of its length, and then decreasing in thickness for the remainder of its length, means for securing a fishing line to said body to provide a line of draft to said body at a location on the upper surface thereof intermediate its ends, but closer to its center than to either end, and means for suspending a fishing hook from the lower surface of said body intermediate its ends.

2. A fishing lure comprising an elongate body having a longitudinally generally downwardly arched outline formed by an upper surface that is concavely curved longitudinally and convexly curved laterally throughout its length and a lower surface that is convexly curved longitudinally, and having a concavity in its front end that is downwardly and rearwardly inclined from the upper surface of the body to its lower surface, and having a concavity in its lower surface adjacent its rear end, the second-named concavity being gently sloped and the first-named concavity being steeply sloped, whereby the front portion of the lure is stubby and thicker than its rear portion, said body being of substantially uniform width throughout its length, and means for securing a fishing line to said body to provide a line of draft to said body at a location in the upper surface thereof intermediate its ends, but closer to its center than to either end, and means for suspending a fishing hook from the lower surface of said body intermediate the ends of said body.

References Cited in the file of this patent

UNITED STATES PATENTS

| 1,226,701 | Schillinger | May 22, 1917 |
| 1,950,075 | Akerson | Mar. 6, 1934 |
| 2,270,488 | Whithey | Jan. 20, 1942 |
| 2,298,691 | Greggains | Oct. 13, 1942 |
| 2,423,717 | Mikina | July 8, 1947 |
| 2,463,626 | Johnson | Mar. 8, 1949 |
| 2,484,747 | Russell | Oct. 11, 1949 |
| 2,538,484 | Tenn | Jan. 16, 1951 |
| 2,595,191 | Erickson | Apr. 29, 1952 |
| 2,866,292 | Busch | Dec. 30, 1958 |